L. W. TREICHLER.
VACUUM DRYING APPARATUS.
APPLICATION FILED OCT. 15, 1910.
981,501.
Patented Jan. 10, 1911.
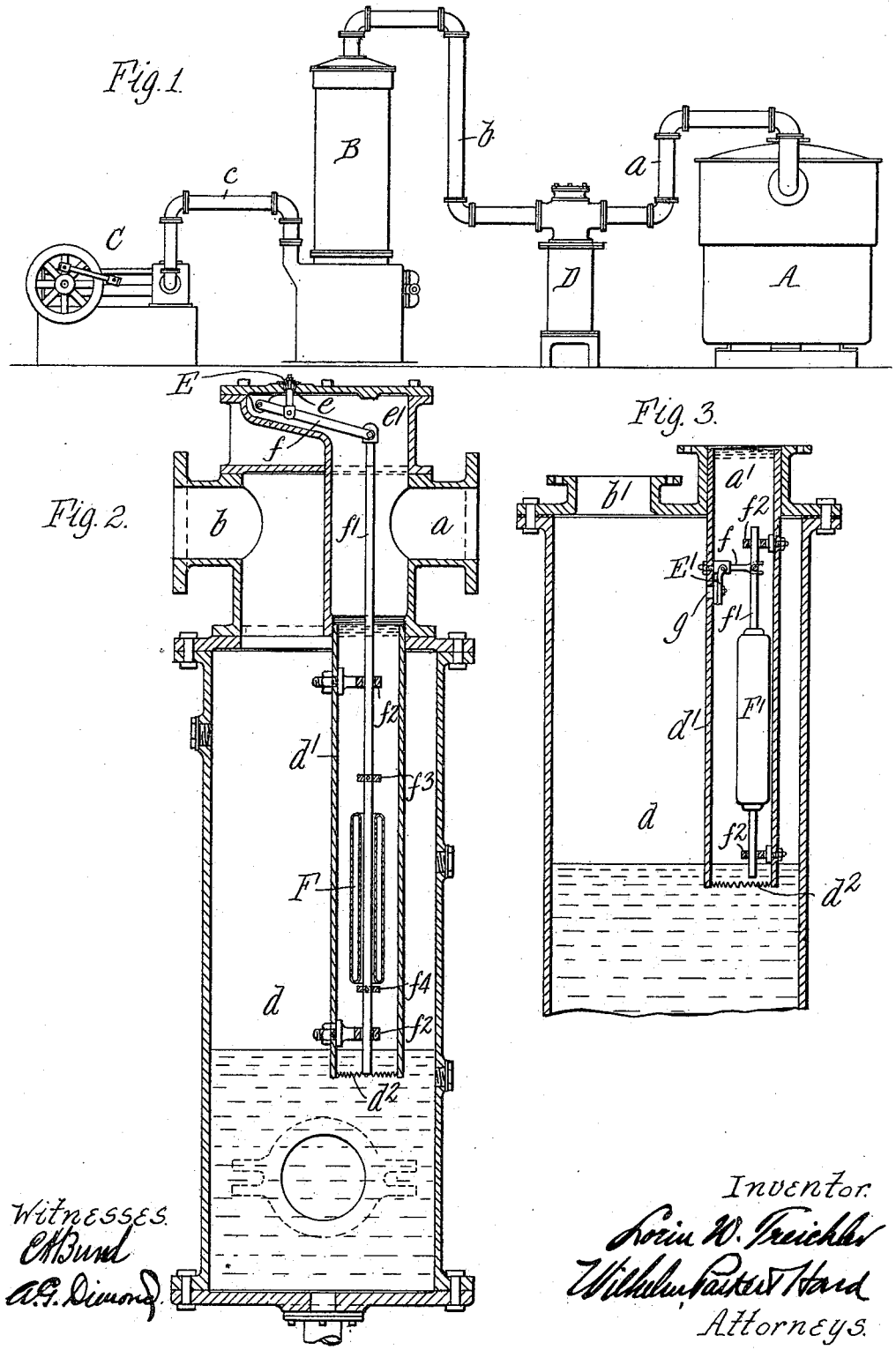

UNITED STATES PATENT OFFICE.

LORIN W. TREICHLER, OF WILLIAMSVILLE, NEW YORK, ASSIGNOR TO J. P. DEVINE COMPANY, OF BUFFALO, NEW YORK.

VACUUM DRYING APPARATUS.

981,501. Specification of Letters Patent. Patented Jan. 10, 1911.

Application filed October 15, 1910. Serial No. 587,186.

*To all whom it may concern:*

Be it known that I, LORIN W. TREICHLER, a citizen of the United States, residing at Williamsville, in the county of Erie and State of New York, have invented a new and useful Improvement in Vacuum Drying Apparatus, of which the following is a specification.

This invention relates to vacuum drying apparatus of that sort in which a dust filter is interposed in the exhaust connections between the drying chamber and the condenser, for removing from the air and vapor drawn from the material in the drying chamber any dust or impurities entrained thereby so as to prevent the dust or impurities from reaching the condenser.

The dust filter ordinarily comprises a receptacle containing water or other filtering liquid and provided with an inlet pipe or passage for the air and vapor which connects with the drying chamber and has its discharge end submerged in the filtering liquid so that the air and vapor are compelled to flow through the filtering liquid. It sometimes happens that on the vacuum being broken in the exhaust connections on the exit side of the filter, whether intentionally or accidentally, the filtering liquid is forced by the pressure thus created from the filter through said inlet pipe or passage into the drying chamber and spoils the material contained therein.

The object of this invention is to prevent the filtering liquid from being thus forced into the drying chamber, by providing a valve which is automatically operated when the vacuum is broken on the exit or pump side of the filter, to break the vacuum between the filter and the drying chamber or to equalize the pressure in the inlet and exit connections of the filter.

In the apparatus hereinafter described and shown in the drawings the automatic vacuum breaking valve is operated by a float which is located in the filter and is actuated by the filtering liquid to open the valve whenever the filtering liquid is forced up to a predetermined height in the inlet pipe of the filter.

In the accompanying drawings: Figure 1 is a diagrammatic view of a vacuum drying apparatus embodying the invention. Fig. 2 is a sectional elevation, on an enlarged scale, of the dust filter. Fig. 3 is a similar view of a modified construction.

Like reference characters refer to like parts in the several figures.

A represents the drying chamber or evaporating vessel, B the condenser, C the vacuum pump, and D the dust filter of a vacuum drying apparatus. These devices are arranged and connected in the usual way, the dust filter D being located between the drying chamber or evaporating vessel and the condenser. The pump C draws the air and vapor from the drying chamber A through an inlet pipe $a$ into the filter D and from the filter through an exit pipe $b$ into the upper portion of the condenser B, to the lower portion of which the induction pipe $c$ of the pump is connected. The drying chamber or vessel A, the condenser B and the pump C may be of the usual or any suitable construction.

The dust filter comprises, as usual, a receptacle $d$ in the lower portion of which the water or other filtering liquid is contained, and a descending pipe or passage $d'$, the lower discharge end of which is submerged in the filtering liquid. The pipe or passage connects at its upper end with and is, in effect, a continuation of the inlet pipe $a$ leading from the drying chamber, so that the air and vapor in flowing through the filter from the inlet pipe $a$ to the exit pipe $b$, which leads from the upper portion of the filter receptacle $d$, are compelled to pass through the filtering liquid. The air and vapor in leaving the submerged end of the pipe $d'$ are broken up and rise through the filtering liquid in the form of bubbles, whereby the dust and impurities are separated from the vapor. In order to increase the breaking up of the air and vapor and insure a thorough cleansing thereof, the submerged end of the pipe is preferably serrated or notched as shown at $d^2$. The filter may, however, be of any other suitable construction having a vapor pipe or passage with a submerged discharge end for compelling the air and vapor to flow through the filtering liquid.

The automatic vacuum breaking valve, which can be of any suitable construction, is placed in any suitable location for admitting air to the apparatus on the inlet side of the filter or for placing the inlet and exit connections of the filter in communication to equalize the pressure therein. For instance, in the embodiment of the invention illustrated in Fig. 2 the automatic valve E controls an air inlet opening $e$ through which external air is admitted, when the valve is opened, to a chamber $e'$ in the upper part of the filter with which the upper end of the descending pipe $d'$ and inlet pipe $a$ communicate. The valve opens outwardly and is connected by a lever $f$ to a vertically-movable rod $f'$ which depends into the descending pipe $d'$ and carries a float F. The rod $f'$ is movable in suitable guide brackets $f^2$ and the float is preferably permitted a limited free movement on the rod between upper and lower collars or stops $f^3$ $f^4$ on the rod so that the up and down movements of the float caused by the turmoil or agitation of the liquid incident to the ordinary operation of the filter will not actuate the valve.

Normally the valve E is held closed by atmospheric pressure and the weight of the rod $f'$ and float F. If the vacuum is broken anywhere in the apparatus on the exit side of the filter so as to create a greater pressure in the exit connection of the filter than in the inlet connection thereof, the pressure will force the liquid up in the pipe $d'$ of the filter and lift the float high enough to open the valve F. The atmospheric pressure thus admitted to the pipe $d'$ of the filter equalizes or over-balances the pressure in the exit connection and prevents the filtering liquid from being forced through the inlet pipe into the drying chamber.

Fig. 3 illustrates another construction for accomplishing a similar result. In this construction the vacuum breaking valve E' controls an opening $g$ in the pipe $d'$ by which the inlet and exit connections $a'$ and $b'$ of the filter are adapted to be placed in communication above the filtering liquid by opening the valve. This valve, like that in the first construction described, is actuated by a float F' in the pipe $d'$ of the filter.

The valve is normally held closed by the weight of the float and its connections to the valve. When the vacuum is broken in the apparatus at the exit side of the filter the liquid will be forced up in the pipe $d'$ and will lift the float F', thereby opening the valve E' and equalizing the pressure in the inlet and exit connections of the filter, which prevents the liquid from being forced through the inlet pipe into the drying chamber. By this arrangement the valve does not admit external air to the drying chamber, and in this respect this construction has an advantage over that first described.

Manifestly the invention is not limited to the constructions and arrangements of the valve and the operating means described, and valves of other construction and arrangement can be used and can be operated by different means adapted to move the valve to break the vacuum or increase the pressure on the inlet side of the filter upon the vacuum being broken on the exit side of the filter.

I claim as my invention:

1. In a vacuum drying apparatus, the combination with the drying chamber, and a filter having a vapor inlet connection leading from the drying chamber and a vapor exit connection and containing filtering liquid through which the vapor is drawn from the drying chamber, of pressure-controlled means which operate automatically to break the vacuum in said inlet connection upon the vacuum being broken in said exit connection, substantially as set forth.

2. In a vacuum drying apparatus, the combination with the drying chamber, and a filter having a vapor inlet connection leading from the drying chamber and a vapor exit connection and containing filtering liquid through which the vapor is drawn from the drying chamber, of a valve, and means which are actuated automatically by the filtering liquid and operate said valve to break the vacuum in said inlet connection upon the vacuum being broken in said exit connection, substantially as set forth.

3. In a vacuum drying apparatus, the combination with the drying chamber, and a filter having a vapor inlet connection leading from the drying chamber and a vapor exit connection and containing filtering liquid through which the vapor is drawn from the drying chamber, of a valve for admitting pressure to said inlet connection, and means which are actuated automatically by the filtering liquid and open said valve to admit pressure to said inlet connection upon the vacuum being broken in said exit connection, substantially as set forth.

4. In a vacuum drying apparatus, the combination with the drying chamber, and a filter having a vapor inlet connection leading from the drying chamber and a vapor exit connection and containing filtering liquid through which the vapor is drawn from the drying chamber, of a valve, and a float which is actuated by the filtering liquid and operates said valve to break the vacuum in said inlet connection upon the vacuum being broken in said exit connection, substantially as set forth.

5. In a vacuum drying apparatus, the combination with the drying chamber, the vacuum pump, and a filter having a vapor inlet connected to the drying chamber and a vapor exit connected to the pump and containing filtering liquid through which the vapor is drawn from the drying chamber, of a valve controlled opening communicating with said inlet connection, and means which are actuated automatically by the filtering liquid and open said valve to admit pressure to said inlet connection upon the vacuum being broken in said exit connection, substantially as set forth.

6. In a vacuum drying apparatus, the combination with the drying chamber, and a filter comprising a receptacle containing filtering liquid, a vapor inlet connection which leads from the drying chamber and has its discharge end submerged in said liquid, and a vapor exit connection, of a vacuum breaking valve, and automatically acting means which actuate said valve to break the vacuum in said inlet connection upon the vacuum being broken in said exit connection, substantially as set forth.

7. In a vacuum drying apparatus, the combination with the drying chamber, and a filter comprising a receptacle containing filtering liquid, a vapor inlet connection which leads from the drying chamber and has its discharge end submerged in said liquid, and a vapor exit connection, of a vacuum breaking valve, an actuating rod for said valve, and a float located in said inlet connection which has a limited free movement on said rod and is actuated by the filtering liquid to operate said valve upon the vacuum being broken in said exit connection, substantially as set forth.

Witness my hand, this 30th day of September, 1910.

LORIN W. TREICHLER.

Witnesses:
MARGARET F. TREICHLER,
MABEL G. FRANTZ.